(12) United States Patent
Jiang

(10) Patent No.: US 9,279,560 B2
(45) Date of Patent: Mar. 8, 2016

(54) LED LENS AND LCD BACKLIGHT SCREEN

(71) Applicant: DONG GUAN OKLENS OPTICS TECHNOLOGY CO., LTD., Dongguan, Guangdong (CN)

(72) Inventor: Liwang Jiang, Guangdong (CN)

(73) Assignee: DONG GUAN OKLENS OPTICS TECHNOLOGY CO., LTD., Dongguan (CN)

( * ) Notice: Subject to any disclaimer, the term of this patent is extended or adjusted under 35 U.S.C. 154(b) by 246 days.

(21) Appl. No.: 14/093,033

(22) Filed: Nov. 28, 2013

(65) Prior Publication Data
US 2015/0077976 A1    Mar. 19, 2015

(30) Foreign Application Priority Data
Sep. 13, 2013    (CN) .......................... 2013 1 0420369

(51) Int. Cl.
| | |
|---|---|
| *F21V 5/00* | (2015.01) |
| *F21V 5/04* | (2006.01) |
| *G02F 1/1335* | (2006.01) |
| *G02B 19/00* | (2006.01) |

(52) U.S. Cl.
CPC .............. *F21V 5/04* (2013.01); *G02B 19/0028* (2013.01); *G02B 19/0061* (2013.01); *G02F 1/133603* (2013.01); *G02F 1/133606* (2013.01); *G02F 2001/133607* (2013.01)

(58) Field of Classification Search
CPC ................ F21V 5/04; G02F 1/133603; G02F 1/133606; G02F 2001/133607; G02B 19/0028; G02B 19/0061

See application file for complete search history.

(56) References Cited

U.S. PATENT DOCUMENTS 7,703,950 B2 *   4/2010   Ewert ................. B29C 45/0025
                                                            362/311.02

FOREIGN PATENT DOCUMENTS

CN          202927738 U       5/2013

OTHER PUBLICATIONS

1st Office Action of counterpart Chinese Patent Application No. 201310420369.3 issue on Jan. 29, 2015.

* cited by examiner

*Primary Examiner* — Thomas M Sember

(57) ABSTRACT

The present invention discloses a new LED lens and LCD backlight screen thereof. The said new LED lens includes base stand, the first protruding stand set on the base stand and the second protruding stand set on the first protruding stand; the side wall of the first protruding stand and the side wall of the second protruding stand constitute the exit surface, the side wall of the first protruding stand is outside-protruding curved surface structure; the top surface of the second protruding stand is reflective surface, and the reflective surface is conic concave structure; the bottom of the base stand is set the cylindrical hole for installing LED, and the surface of the cylindrical hole constitutes incidence surface. The present invention achieves the intention of acquiring the same brightness degree through reducing the projection distance by half compared to the present refractive optical lens with the same LED arrangement distance.

8 Claims, 5 Drawing Sheets

LED LENS AND LCD BACKLIGHT SCREEN

CROSS-REFERENCE TO RELATED APPLICATIONS

This present application claims the benefit of Chinese Patent Application No. 201310420369.3 filed on Sep. 13, 2013; the contents of which are hereby incorporated by reference.

FIELD

The present invention relates to the technical field of LED (Light Emitting Diode) lens, particularly relates to new LED lens and LCD backlight screen.

BACKGROUND ART

LED light source has been widely used in the fields of illumination and LCD backlight screen due to its traits of energy saving and environmental protection. Especially it has been used in LCD backlight screen in large quantities, and has created wide social value and commercial value. It has mainly two arrangement ways of LED backlight source:
1. Side-entering Mode: to achieve well-distributed brightness of screen by utilizing LED cooperated with light guide plate.
2. Directly-entering Mode: to achieve well-distributed brightness of screen by utilizing LED cooperated with light guide plate illuminating directly the screen behind the screen.

Nowadays, it has been used primarily refractive optical lens in directly-entering mode of arrangement way, and owing to the influence of refractivity and total reflection effect of the material of this kind of lens, it has necessarily the higher projection distance between the assembly of LED and lens and the screen to achieve well-distributed brightness on the screen, under the premise of fixed arranging gap of LEDs. Obviously, the longer the projection distance, the higher the cost of LCD backlight source, and it doesn't meet the need of the users to the LCD illuminating apparatus as lightness and thinness.

SUMMARY OF THE INVENTION

The aim of the present invention is to disclose new LED lens and LCD backlight screen to resolve the problem of the present refractive optical lens need the higher projection distance to acquire well-distributed brightness on the screen, and further to resolve the problem of the high cost and large thickness of the LCD backlight screen.

To achieve the purpose of the present invention, the technical solution of the present invention is as follows:

A new LED lens, includes base stand, the first protruding stand set on the base stand and the second protruding stand set on the first protruding stand; the side wall of the first protruding stand and the side wall of the second protruding stand constitute the exit surface, the side wall of the first protruding stand is outside-protruding curved surface structure; the top surface of the second protruding stand is reflective surface, and the reflective surface is conic concave structure; the bottom of the base stand is set the cylindrical hole for installing LED, and the surface of the cylindrical hole constitutes incidence surface; the light from LED is irradiated inward from the incidence surface, and a part of the light is irradiated outward from the exit surface after reflected by the reflective surface, and the other part of the light is irradiated from the exit surface directly.

Further, the side wall of the said second protruding stand is cylindrical structure or conic structure.

Further, the surface of the cylindrical hole is constituted by the side surface of the cylindrical hole and the bottom surface of the cylindrical hole, and the side surface of the cylindrical hole is conic concave structure.

Further, the sectional profile of the said conic concave structure is outside-protruding curved structure.

Further, the said base stand, the said first protruding stand and the said second protruding stand are integral body structure, and are made of the transparent resin material with the refractivity of 1.3~1.6.

Further, the said base stand is set ringlike groove, and the said ringlike groove is placed outside of the cylindrical hole and cooperated with the cylindrical hole with the same axle.

Further, the surface of the said ringlike groove is set irregular granular texture with the features of scattering.

Further, the said base stand is circular base stand or rectangular base stand.

Further, the surface of the side wall of the said first protruding stand and the surface of the side wall of the said second protruding stand are set regular texture with the features of scattering fully or partially.

And the present invention also disclosed LCD backlight screen, which includes any one of the said new LED lens.

Further, it also includes reflective membrane and scattering plate, and several the said new LED lens are set on the reflective membrane and arranged as rectangular array, the row distance is A, and the line distance is B; the scattering plate is above the reflective membrane and the new LED lens, and the distance between the scattering plate and reflective membrane is C, the ratio of distance and height is $$S = \frac{\frac{1}{2} \times (A+B)}{C},$$

and S is more than or equal to 4.5.

The present invention has the advantageous effects compared to the present technique:

The present invent takes the above-mentioned structure, and provides a totally new refractive optical LED lens, to achieve the intention of acquiring the same brightness and evenness degree through reducing the projection distance by half (to achieve the large ratio of distance to height) compared to the present refractive optical lens with the same arrangement distance, utilizing the optical basic theory combined with computer simulation technology.

After the present invention has made the exit surface a bending surface with a certain extent, the scope of the light emitted from LED after passing the lens is bigger, and when it is used on the LCD backlight screen, the backlight effect of the LCD backlight screen is more well-distributed.

BRIEF DESCRIPTION OF THE DRAWINGS

To illustrate the technical scheme more clearly, the drawings used in the description of the embodiments are instructed simply hereinafter. Obviously, the drawings of the following description are some examples, and to the ordinary skilled of the art, it can be obtained other drawings based on those drawings without inventive labour.

Figure 1:
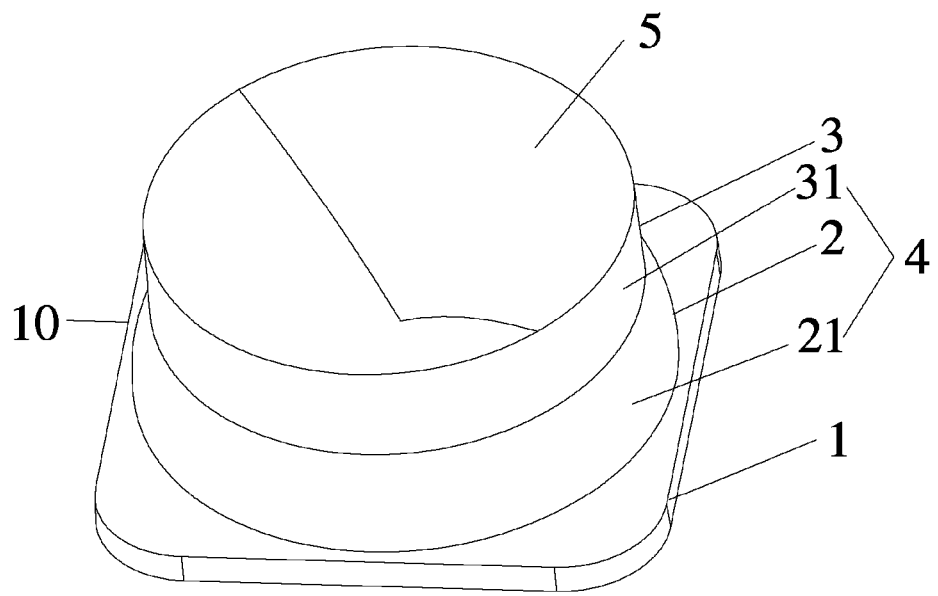
FIG. 1 is the three-dimensional schematic diagram 1 of the example 1 of the new LED lens of the present invention.
Figure 2:
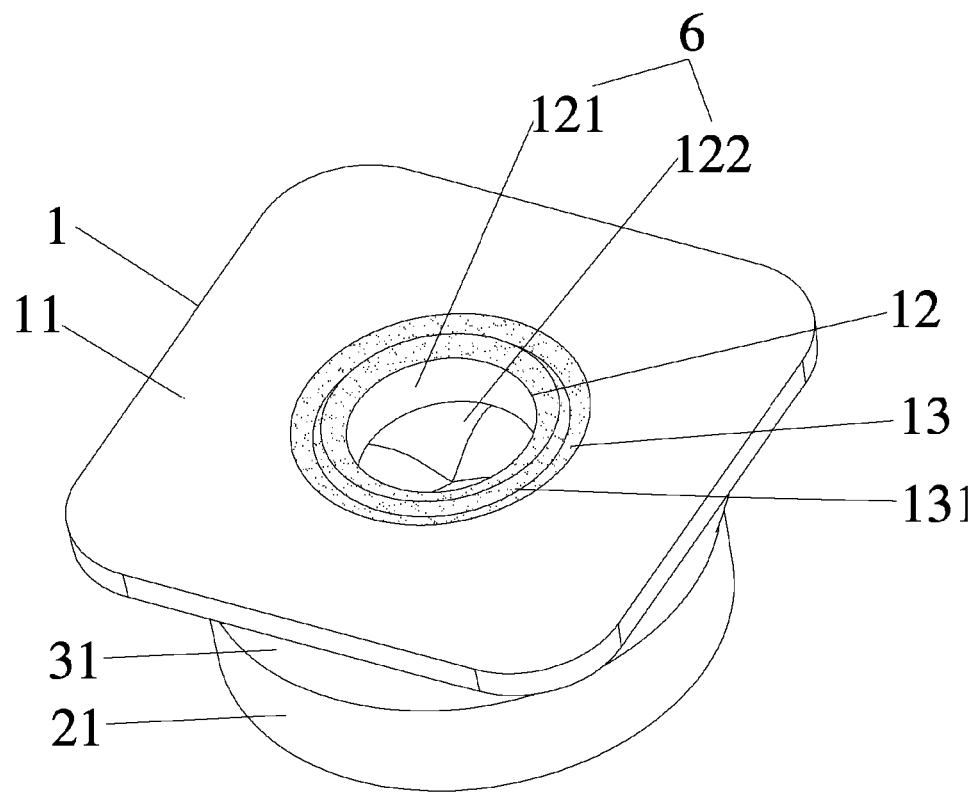
FIG. 2 is the three-dimensional schematic diagram 2 of the example 1 showed in the FIG. 1.
Figure 3:
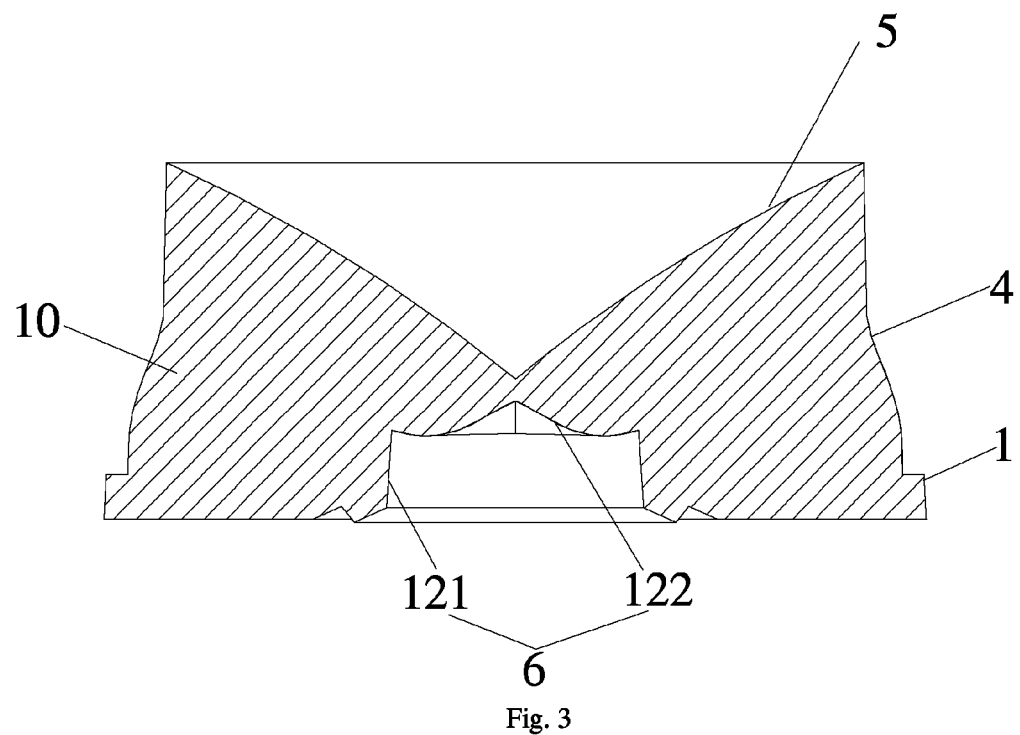
FIG. 3 is the cross-sectional schematic diagram of the example 1 showed in the FIG. 1.
Figure 4:
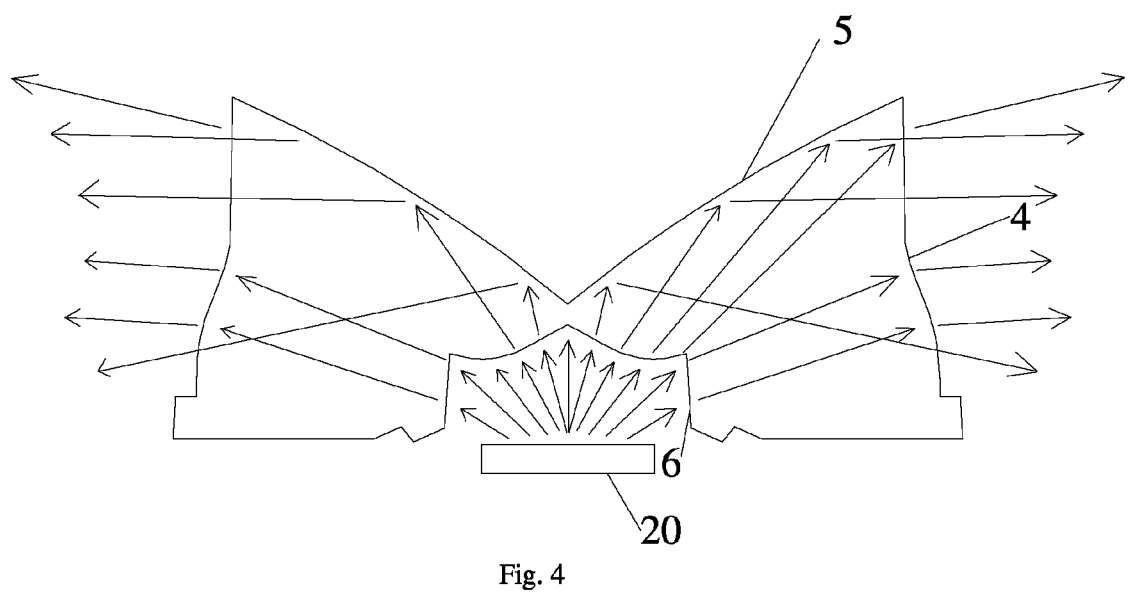
FIG. 4 is the schematic diagram of the path of the refracted light of example 1 showed in the FIG. 1.

Wherein, 10—new LED lens; 1—base stand; 11—bottom of the base stand; 12—cylindrical hole; 121—side surface of the cylindrical hole; 122—bottom surface of the cylindrical hole; 13—ringlike groove; 131—irregular granular texture; 2—the first protruding stand; 21—side wall of the first protruding stand; 3—the second protruding stand; 31—side wall of the second protruding stand; 4—exit surface; 5—reflective surface; 6—incidence surface; 20—LED; 30—LCD backlight screen; 31—reflective membrane; 32—scattering plate; 33—brightness enhancing film; 34—LCD panel

THE DETAILED EMBODIMENTS

Hereinafter in conjunction with the accompanying drawings of the embodiments of the present invention, the technical scheme of the embodiments of the present invention is described apparently and completely. Obviously, it should be understood that the embodiments described herein are only a part of the embodiments of the present invention, not all of the embodiments.

EXAMPLE 1

As shown in FIG. 1 to FIG. 4 of the example 1, the new LED lens 10, includes base stand 1, the first protruding stand 2 set on the base stand 1 and the second protruding stand 3 set on the first protruding stand 2; the side wall of the first protruding stand 21 and the side wall of the second protruding stand 31 constitute the exit surface 4, the side wall of the first protruding stand 21 is outside-protruding curved surface structure; the top surface of the second protruding stand is reflective surface 5, and the reflective surface 5 is conic concave structure; the bottom of the base stand 11 is set the cylindrical hole 12 for installing LED 20, and the surface of the cylindrical hole 12 constitutes incidence surface 6; the light from LED is irradiated inward from the incidence surface 6, and a part of the light is irradiated outward from the exit surface 4 after reflected by the reflective surface 5, and the other part of the light is irradiated from the exit surface 4 and the reflective surface 5 directly. The present invent takes the above-mentioned structure, and provides a totally new refractive optical LED lens, to achieve the intention of acquiring the same brightness and evenness degree through reducing the projection distance by half (to achieve the large ratio of distance to height) compared to the present refractive optical lens with the same arrangement distance, utilizing the optical basic theory combined with computer simulation technology.

The side wall of the said second protruding stand 31 of the example 1 is cylindrical structure or conic structure.

The surface of the cylindrical hole 12 is constituted by the side surface of the cylindrical hole 121 and the bottom surface of the cylindrical hole 122, es. the side surface of the cylindrical hole 121 and the bottom surface of the cylindrical hole 122 constitute the incidence surface 6. The side surface of the cylindrical hole 121 is cylindrical structure, and the bottom surface of the cylindrical hole 122 is conic concave structure. The sectional profile of the said conic concave structure of example 1 is outside-protruding curved structure.

The base stand 1, the first protruding stand 2 and the said second protruding stand 3 are integral body structure, and are made of the transparent resin material with the refractivity of 1.3~1.6.

The base stand 1 is set ringlike groove 13, and the said ringlike groove 13 is placed outside of the cylindrical hole 12 and cooperated with the cylindrical hole 12 with the same axle. The surface of the said ringlike groove 13 is set irregular granular texture 131 with the features of scattering.

Figure 5:
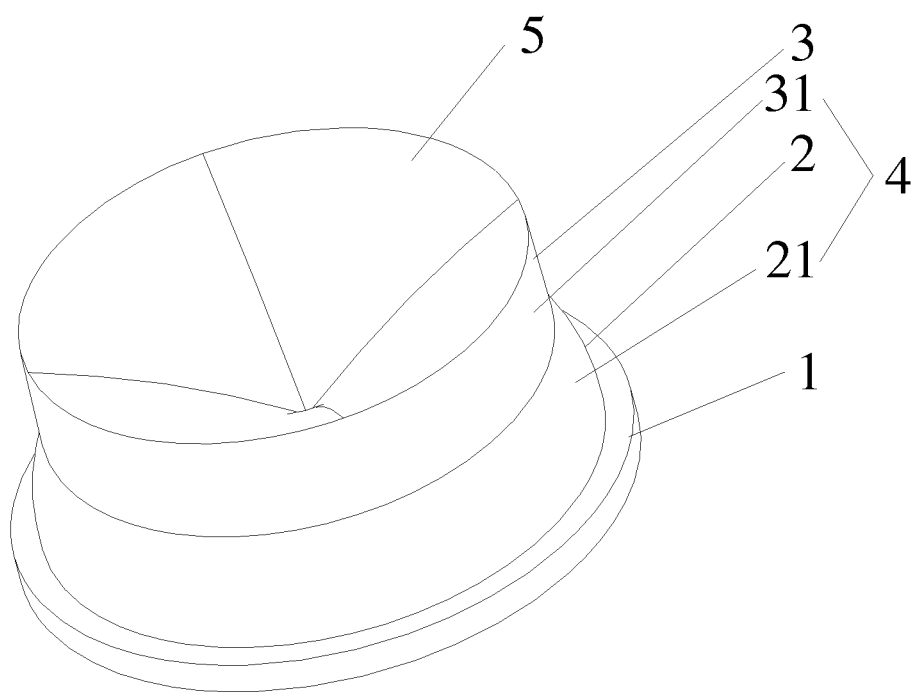
FIG. 5 is the schematic diagram of the other example of the new LED lens of the present invention, wherein the base stand is circular base stand.

The base stand 1, the first protruding stand 2 and the said second protruding stand 3 are cooperated with the same axle; as another embodiment of the example, the base stand 2 also can be circular base stand (as shown FIG. 5).

The other structures of the new LED lens of the example 1 are referred the prior art.

EXAMPLE 2

Figure 6:
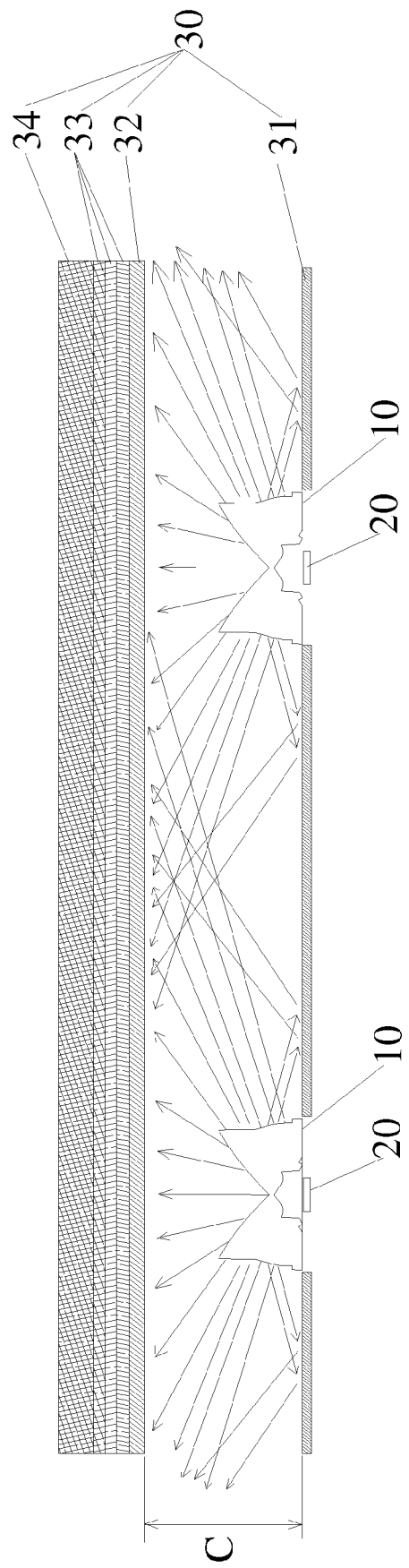
FIG. 6 is the structure schematic diagram of the LCD backlight screen of the example 2 of the present invention.
Figure 7:
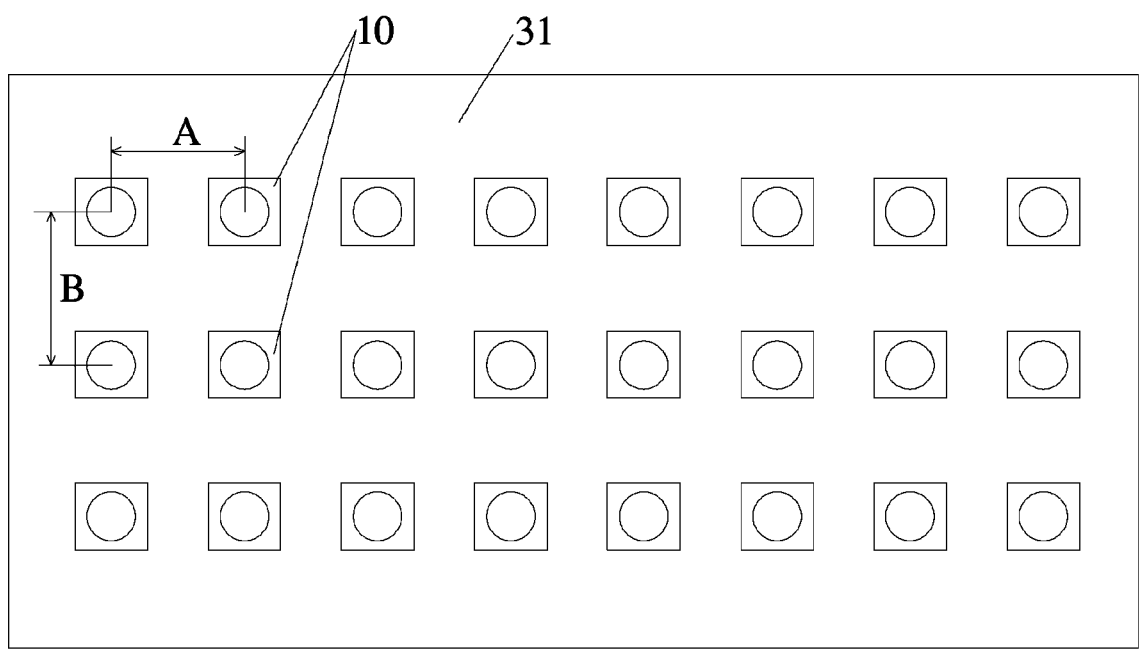
FIG. 7 is the installation schematic diagram of the reflective membrane and new LED lens of FIG. 5.

As shown in FIG. 6 and FIG. 7, the LCD backlight screen 30 of the example 2 includes the said new LED lens 10 of the example 1. And the example 2 also includes reflective membrane 31, scattering plate 32, brightness enhancing film 33, and LCD panel 34. And several the new LED lens 10 are set on the reflective membrane 31 and arranged as rectangular array, the row distance is A, and the line distance is B; the scattering plate 32 is above the reflective membrane 31 and the new LED lens 10, and the distance between the scattering plate 32 and reflective membrane 31 is C, the ratio of distance and height is $$S = \frac{\frac{1}{2} \times (A+B)}{C},$$

and S is more than or equal to 4.5. In the example, the brightness enhancing film 33 covers on the scattering plate 32, the LCD panel 34 covers on the scattering plate 32, and the quantity of the brightness enhancing film 33 is three layers but not limited to three layers, it can be increased or decreased as needed.

The other structures of the LCD backlight screen of the example 2 are referred the prior art.

The present invention is not limited to the above-mentioned embodiments, if these modifications and variations of the present invention are not deviated from the spirit and scope of the present invention, and if these modifications and variations belong to the scope of the claims of the present invention and the identical technique, the present invention are intended to include these modifications and variations.

What is claimed is:

1. A LCD backlight screen, including an LED lens, wherein the LED lens includes: a base stand, a first protruding stand set on the base stand and a second protruding stand set on the first protruding stand; a side wall of the first protruding stand and a side wall of the second protruding stand constitute an exit surface, the side wall of the first protruding stand is outside-protruding curved surface structure; a top surface of the second protruding stand is a reflective surface, and the reflective surface is conic concave structure; a bottom of the base stand is set a cylindrical hole for installing LED, and a surface of the cylindrical hole constitutes a incidence surface; light from LED is irradiated inward from the incidence surface, and a part of the light is irradiated outward from the exit surface after reflected by the reflective surface, and a remaining part of the light is irradiated from the exit surface directly, further comprising: a reflective membrane and scattering plate, and a plurality of LED lenses are set on the reflective membrane and arranged as an rectangular array, the scattering plate is above the reflective membrane and the LED lenses; a row distance between each LED lens is A, a column line distance between each LED lens is B, a distance between the scattering plate and reflective membrane is C and S represents a ratio of distance and height where $S=\frac{1}{2}(A+B)/C$, and S is more than or equal to 4.5.

2. The LCD backlight screen of claim 1, wherein the side wall of the said second protruding stand is a cylindrical structure or a conic structure.

3. The LCD backlight screen of claim 1, wherein the surface of the cylindrical hole is constituted by a side surface of the cylindrical hole and a bottom surface of the cylindrical hole, and the side surface of the cylindrical hole is a conic concave structure.

4. The LCD backlight screen of claim 1, wherein a sectional profile of the said conic concave structure is outside-protruding curved structure.

5. The LCD backlight screen of claim 1, wherein the said base stand, the said first protruding stand and the said second protruding stand are integral body structure, and are made of the transparent resin material with the refractivity of 1.3~1.6.

6. The LCD backlight screen of claim 1, wherein the said base stand has a ringlike groove, and the said ringlike groove is placed outside of the cylindrical hole and cooperated with the cylindrical hole with the same axle.

7. The LCD backlight screen of claim 1, wherein the surface of the said ringlike groove has irregular granular texture with the features of scattering.

8. The LCD backlight screen of claim 1, wherein the said base stand is a circular base stand or a rectangular base stand.

* * * * *